(12) United States Patent
Rifkin et al.

(10) Patent No.: US 7,685,080 B2
(45) Date of Patent: Mar. 23, 2010

(54) REGULARIZED LEAST SQUARES CLASSIFICATION OR REGRESSION WITH LEAVE-ONE-OUT (LOO) ERROR

(75) Inventors: Ryan Rifkin, Cambridge, MA (US); Ross Lippert, Somerville, MA (US)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 11/535,921

(22) Filed: Sep. 27, 2006

(65) Prior Publication Data

US 2007/0094180 A1 Apr. 26, 2007

Related U.S. Application Data

(60) Provisional application No. 60/721,753, filed on Sep. 28, 2005.

(51) Int. Cl.
*G06E 1/00* (2006.01)
(52) U.S. Cl. ........................................... 706/20; 706/21
(58) Field of Classification Search .................... 706/20, 706/21

See application file for complete search history.

(56) References Cited

U.S. PATENT DOCUMENTS

2006/0074908 A1* 4/2006 Selvaraj et al. .................. 707/6

OTHER PUBLICATIONS

Aronszajn, N., "Theory of Reproducing Kernels," Transactions of the American Mathematical Society, May 1950, pp. 337-404, vol. 68.

Chi, T., et al., "Multiresolution Spectrotemporal Analysis of Complex Sounds," Journal of the Acoustical Society of America, Aug. 2005, pp. 887-906, vol. 118, No. 2.

De Lathauwer, L., et al., "A Multilinear Singular Value Decomposition," SIAM Journal of Matrix Analysis and Applications, 2000, pp. 1253-1278, vol. 21, No. 4.

Evgeniou, T., et al., "Regularization Networks and Support Vector Machines," Advances in Computational Mathematics, 2000, pp. 1-50, vol. 13.

Fine, S., et al., "Efficient SVM Training Using Low-Rank Kernel Representations," Journal of Machine Learning Research, 2001, pp. 243-264, vol. 2.

(Continued)

*Primary Examiner*—David R Vincent
*Assistant Examiner*—Mai T Tran
(74) *Attorney, Agent, or Firm*—Fenwick & West LLP; Mark E. Duell (57) ABSTRACT

Techniques are disclosed that implement algorithms for rapidly finding the leave-one-out (LOO) error for regularized least squares (RLS) problems over a large number of values of the regularization parameter $\lambda$. Algorithms implementing the techniques use approximately the same time and space as training a single regularized least squares classifier/regression algorithm. The techniques include a classification/regression process suitable for moderate sized datasets, based on an eigendecomposition of the unregularized kernel matrix. This process is applied to a number of benchmark datasets, to show empirically that accurate classification/regression can be performed using a Gaussian kernel with surprisingly large values of the bandwidth parameter $\sigma$. It is further demonstrated how to exploit this large $\sigma$ regime to obtain a linear-time algorithm, suitable for large datasets, that computes LOO values and sweeps over $\lambda$.

15 Claims, 6 Drawing Sheets

OTHER PUBLICATIONS

Hastie, T., et al., "The Entire Regularization Path for the Support Vector Machine (1)," Journal of Machine Learning Research, 2004, pp. 1391-1415, vol. 5.

Hastie, T., et al., "The Entire Regularization Path for the Support Vector Machine (2)," 8 pages.

Joachims, T., et al., "Estimating the Generalization Performance of a SVM Efficiently," Dec. 29, 1999, Universität Dortmund, pp. 1-27, Technical Report LS-8, Report 25.

Kingsbury, B., et al., "Robust Speech Recognition in Noisy Environments: The 2001 IBM Spine Evaluation System," IEEE, to appear in Proceedings of ICASSP, 2002, pp. I-53-I-56.

Lehoucq, R. B., et al., "Deflation Techniques for an Implicitly Restarted Amoldi Iteration," SIAM Journal on Matrix Analysis and Applications, Oct. 1996, pp. 789-821, vol. 17, No. 4.

Lehoucq, R. B., et al., "Arpack Users Guide: Solution of Large Scale Eigenvalue Problems by Implicitly Restarted Amoldi Methods," Computational and Applied Mathematics, Technical Report, Rice University, Mar. 14, 1997, pp. 1-140.

Mesgarani, N., et al., "Discrimination of Speech from Nonspeech Based on Multiscale Spectro-Temporal Modulations," IEEE Transactions on Audio, Speech, and Language Processing, May 2006, pp. 920-930, vol. 14, No. 3.

Ramaswamy, S., et al., "Multiclass Cancer Diagnosis Using Tumor Gene Expression Signatures," PNAS, Dec. 18, 2001, pp. 15149-15154, vol. 98, No. 26.

Rifkin, R. M., et al., "Everything Old is New Again: A Fresh Look at Historical Approaches in Machine Learning," Doctoral Dissertation, Massachusetts Institute of Technology, Sep. 2002, pp. 1-225.

Rifkin, R., et al., "In Defense of One-Vs-All Classification," Journal of Machine Learning Research, 2004, pp. 101-141, vol. 5.

Scheirer, E., et al., "Construction and Evaluation of a Robust Multifeature Speech/Music Discriminator," IEEE, to appear in the Proceedings of ICASSP, Apr. 21-24, 1997, pp. 1-4.

Schölkopf, B., "A Generalized Representer Theorem," $14^{th}$ Annual Conference on Computational Learning Theory, 2001, pp. 416-426.

Smola, A. J., "Sparse Greedy Matrix Approximation for Machine Learning," Proceedings of the International Conference on Machine Learning, 8 pages, Proc. 7th Intl Conf on Machine Learning, 2000.

Vapnik, V. N., "Statistical Learning Theory," John Wiley & Sons, Inc., 1998, pp. vii-xix, 1-15.

Wahba, G., "Spline Models for Observational Data," Society for Industrial and Applied Mathematics, 1990, pp. 1-20, 45-65, vol. 59 of CBMS-NSF Regional Conference Series in Applied Mathematics.

Williams, C. K. I., et al., "Using the Nyström Method to Speed Up Kernel Machines," Advances in Neural Information Processing Systems 13, Proceedings of the 2000 Conference, 2000, pp. 682-688.

Yang, C., et al., "Efficient Kernel Machines Using the Improved Fast Gauss Transform," Advances in Neural Information Processing Systems 17, Proceedings of the 2004 Conference, 2004, pp. 1561-1568.

Golub, G. H., et al., "Matrix Computations, Third Edition," 1996, pp. 448-460, 556-561, 590-594, 601-605, 621-635.

* cited by examiner

REGULARIZED LEAST SQUARES CLASSIFICATION OR REGRESSION WITH LEAVE-ONE-OUT (LOO) ERROR

RELATED APPLICATIONS

This application claims the benefit of U.S. Provisional Application No. 60/721,753, filed Sep. 28, 2005, titled "Making Regularized Least Squares Practical," which is herein incorporated in its entirety by reference.

FIELD OF THE INVENTION

The invention relates to machine learning, and more particularly, to fast regularized least squares classification/regression.

BACKGROUND OF THE INVENTION

Given a dataset $S=(\bar{x}_1, y_1), (\bar{x}_2, y_2), \ldots, (\bar{x}_n, y_n)$ of n points in d dimensions, the inductive learning task is to build a function $f(\bar{x})$ that, given a new point $\bar{x}$, can predict the associated y value. A common framework for solving such problems is Tikhonov regularization (Evgeniou et al., 2000), in which the following minimization problem is solved:

$$\min_{f \in H} \frac{1}{n} \sum_{i=1}^{n} V(f(\bar{x}_i), y_i) + \lambda \|f\|_K^2$$

Here, H is a Reproducing Kernel Hilbert Space or RKHS (Aronszajn, 1950) with associated kernel function K, $\|f\|_K^2$ is the squared norm in the RKHS, $\lambda$ is a regularization constant controlling the tradeoff between fitting the training set accurately and forcing smoothness of $f$ (in the RKHS norm), and $V(f(\bar{x}), y)$ is a loss function representing the price paid when $\bar{x}$ is seen and $f(\bar{x})$ is predicted, but the actual associated value is y. Different choices of V give rise to different learning schemes (Evgeniou et al., 2000). In particular, the hinge loss $V(f(\bar{x}), y)$ max $(1-yf(\bar{x}),0)$ induces the well-known support vector machine, also referred to as SVM (Vapnik, 1998), while the square loss $V(f(\bar{x}), y)=(f(\bar{x})-y)^2$ induces a simple regularized least squares classifier (Wahba, 1990).

For a wide range of loss functions, including the square loss, the so-called Representer Theorem proves that the solution to the Tikhonov minimization problem will have the following form (Schölkopf et al., 2001; Wahba, 1990):

$$f_s(\bar{x}) = \sum_{i=1}^{n} c_i K(\bar{x}, \bar{x}_i)$$

The Representer Theorem reduces the infinite dimensional problem of finding a function in an RKHS to the n-dimensional problem of finding the coefficients $c_i$. For Regularized Least Squares (RLS), the loss function is differentiable, and simple algebra shows that the coefficients c can be found by solving the linear system $(K+\lambda nI)c=y$, where, via a commonly used and accepted notational short-cut, K is the n by n matrix satisfying $K_{ij}=K(\bar{x}_i, \bar{x}_j)$.

The RLS algorithm has several attractive properties. It is conceptually simple, and can be implemented efficiently in a few lines of MATLAB code. It places regression and classification in exactly the same framework (i.e., the same code is used to solve regression and classification problems). Intuitively, it may seem that the squared loss function, while well-suited for regression, is a poor choice for classification problems when compared to the hinge loss. In particular, given a point ($\bar{x}$, y=1), the square loss penalizes $f(\bar{x})=10$ and $f(\bar{x})=-9$ equally, while the SVMs hinge loss penalizes only the latter choice. However, across a wide range of problems, the regularized least squares classifier (RLSC) performs as well as the SVM (Rifkin, 2002; Rifkin & Klautau, 2004).

On the other hand, for large datasets and non-linear kernels, RLS has a serious problem as compared to the more popular SVM. In more detail, direct methods for solving RLS manipulate the entire kernel matrix and therefore require $O(n^3)$ time and (even worse) $O(n^2)$ space. These problems can be alleviated by using iterative methods such as conjugate gradient, which require only matrix-vector products. However, recomputing the kernel matrix at each iteration requires $O(n^2d)$ work, which can be prohibitive if d is large. The SVM, on the other hand, is quite attractive computationally, as the flat loss function for correctly classified points induces a sparse solution in which all the correctly classified points have zero coefficients $c_i$. Kernel products between pairs of training points both of which are correctly classified at all times during training are never computed by state-of-the-art SVM algorithms. In practice, SVM algorithms generate only a small fraction of the kernel matrix, making SVMs much more suited than RLS to large non-linear problems.

In more detail, when a linear kernel $K(\bar{x}_i, \bar{x}_j)=\bar{x}_i \cdot \bar{x}_j$ is used, the relative effectiveness of SVMs and RLSCs is reversed. Solving an RLSC problem for c becomes an $O(nd^2)$ time and $O(nd)$ memory problem, either directly using the Sherman-Morrison-Woodbury formula or iteratively via conjugate gradient (Golub & Van Loan, 1996). The SVM is also somewhat faster, but the difference is not as dramatic, because state-of-the-art SVM algorithms are coordinate ascent algorithms that work at the boundary of the feasible region, optimizing a few coefficients while holding the rest fixed, and therefore require explicit entries of the kernel matrix K. Some attempts at interior point SVMs, which can be represented in terms of matrix-vector products and could therefore take full advantage of the savings offered by a linear kernel, have been made (Fine & Scheinberg, 2001). However, these approaches have not yet achieved the same performance as state-of-the-art linear SVMs, and RLS classification remains the fastest way to train a regularized linear classifier.

What is needed, therefore, are techniques that make using regularized least squares more practical.

SUMMARY OF THE INVENTION

One embodiment of the present invention provides a computer implemented methodology for regularized least squares (RLS) classification/regression. The method includes receiving a training set of data, and computing a matrix decomposition using the training set (e.g., eigendecomposition or SVD). The method further includes receiving a plurality of regularization parameters, and computing coefficients for each regularization parameter using the matrix decomposition. The method continues with computing a leave-one-out (LOO) error for each of the regularization parameters, and selecting the regularization parameter with the lowest LOO error. The method may further include predicting future data points based on at least one of coefficients c or a hyperplane function w associated with the selected regularization parameter. In one particular case, computing a matrix decomposition using the training set includes computing a singular value decomposition (SVD) using the training set, wherein the SVD is the matrix decomposition. In another particular case, computing a matrix decomposition using the training set includes forming a kernel matrix using the input training set, and computing an eigendecomposition of the kernel matrix, wherein the eigendecomposition is the matrix decomposition. In one such case, the kernel matrix is represented explicitly, and the method includes storing the kernel matrix. In another such case, the kernel matrix is represented explicitly, and the method computes the LOO error for all the regularization parameters in $O(n^3+n^2 d)$ time and $O(n^2)$ space, where n is the number of points in d dimensions of the training set. In another such case, the kernel matrix is an n by n matrix K satisfying $K_{ij}=K(\bar{x}_i, \bar{x}_j)$ and having a form $$K(\bar{x}_i, \bar{x}_j) = \exp\left(\frac{\|\bar{x}_i - \bar{x}_j\|^2}{2\sigma^2}\right),$$

where x is a vector of data points included in the training set and σ is a user-selected bandwidth parameter. Alternatively, the kernel matrix can be represented using, for example, matrix vector products (particularly if the matrix is too large to store all at once). In one such case, the matrix vector products are approximated using an Improved Fast Gauss Transform (IFGT).

Another embodiment of the present invention provides a machine-readable medium (e.g., one or more compact disks, diskettes, servers, memory sticks, or hard drives) encoded with instructions, that when executed by one or more processors, cause the processor to carry out a process for regularized least squares (RLS) classification/regression. This process can be, for example, similar to or a variation of the previously described method.

Another embodiment of the present invention provides a regularized least squares (RLS) classification/regression system. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. In one particular case, the system is implemented in a computing environment such as a desktop or laptop computer, with an executable RLS classification module or set of modules stored therein.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques are disclosed that make using regularized least squares (RLS) more practical, and in particular, that decrease computational burdens associated with conventional techniques.

General Overview

In one embodiment of the present invention, a regularized least squares classifier (RLSC) is provided. As is known, classifiers are programmed or otherwise configured to receive input values (such as values of an object's features or a situation's characteristics), and to produce as an output a discrete label related to those input values. Face recognition, object tracking, room navigation, medical image analysis, and voice recognition are example applications in which classification is applied. Classifiers may be implemented as fixed classifiers or learning classifiers. In addition, note that the techniques described herein can also be applied to RLS regression problems, as will be appreciated in light of this disclosure.

As previously explained, the loss function for RLS is differentiable, and coefficients c can be found by solving the linear system $(K+\lambda nI)c=y$, where K is the n by n matrix satisfying $K_{ij}=K(\bar{x}_i, \bar{x}_j)$. In accordance with an embodiment of the present invention, Gaussian kernels of the form $$K(\bar{x}_i, \bar{x}_j) = \exp\left(\frac{\|\bar{x}_i - \bar{x}_j\|^2}{2\sigma^2}\right)$$

are considered, where σ is a user-selected bandwidth parameter. Other implementations will be apparent in light of this disclosure. The RLS algorithm has several attractive properties, including coding simplicity (using MATLAB or other suitable computing environments/software packages) and its applicability to both regression and classification problems. In addition, RLS has an explicit, closed-form formula for the LOO error $\theta_{S^i}(\bar{x}_i)$, where $S^i=S-\bar{x}_i$, the training set with the $i^{th}$ point removed. Previous iterative methods for solving RLS have not been able to take advantage of the direct formula for computing the LOO values, which uses explicitly the diagonal of the inverse regularized kernel matrix. Some SVM solvers allow one to compute (Rifkin, 2002) or bound (Joachims, 1999) the LOO, but computing it exactly is computationally costly and bounding it introduces additional error which can be substantial. As discussed herein, for moderate to small datasets, LOO can be effectively used as a "gold standard" for cross-validation: it is almost unbiased and the variance associated with a procedure such as 10-fold cross-validation can be quite high, with different partitionings of the dataset yielding substantially different results. For large datasets, LOO is less important, but still desirable and can be used as discussed herein.

Thus, one embodiment of the present invention makes RLS more practical by showing how, for several RLS related tasks, the regularization parameter λ can be varied over a wide range of values for very little computational cost, simultaneously building classifiers and computing their LOO values on the training set. The choice of $\lambda$ in a regularization scheme is an important one, as a poor choice can lead to an inaccurate classifier. Because RLS (and SVM) are frequently used in a "model selection" framework, the ability to consider a large number of $\lambda$ values simultaneously translates directly into computational savings. The difference is especially important when RLS is used as a component in a feature selection problem (e.g., face or object recognition), or when it is also necessary to select kernel hyperparameters. One methodology described herein begins with, for moderate size problems (where the $O(n^2)$ kernel matrix can be stored and manipulated), finding both the "solution" c and the LOO values for a large number of values of $\lambda$ with a slowdown of only a small constant factor (about 3) compared to solving for a single $\lambda$ "directly." Then, the methodology is used to conduct large-scale experiments on a number of benchmark datasets, where both $\sigma$ and $\lambda$ are varied over a wide range, to show via empirical observation that accurate classification can often be obtained using quite large values of $\sigma$. Also discussed herein is how to exploit the ability to make $\sigma$ large to solve large problems, and a number of computational examples.

System Architecture

Figure 1:
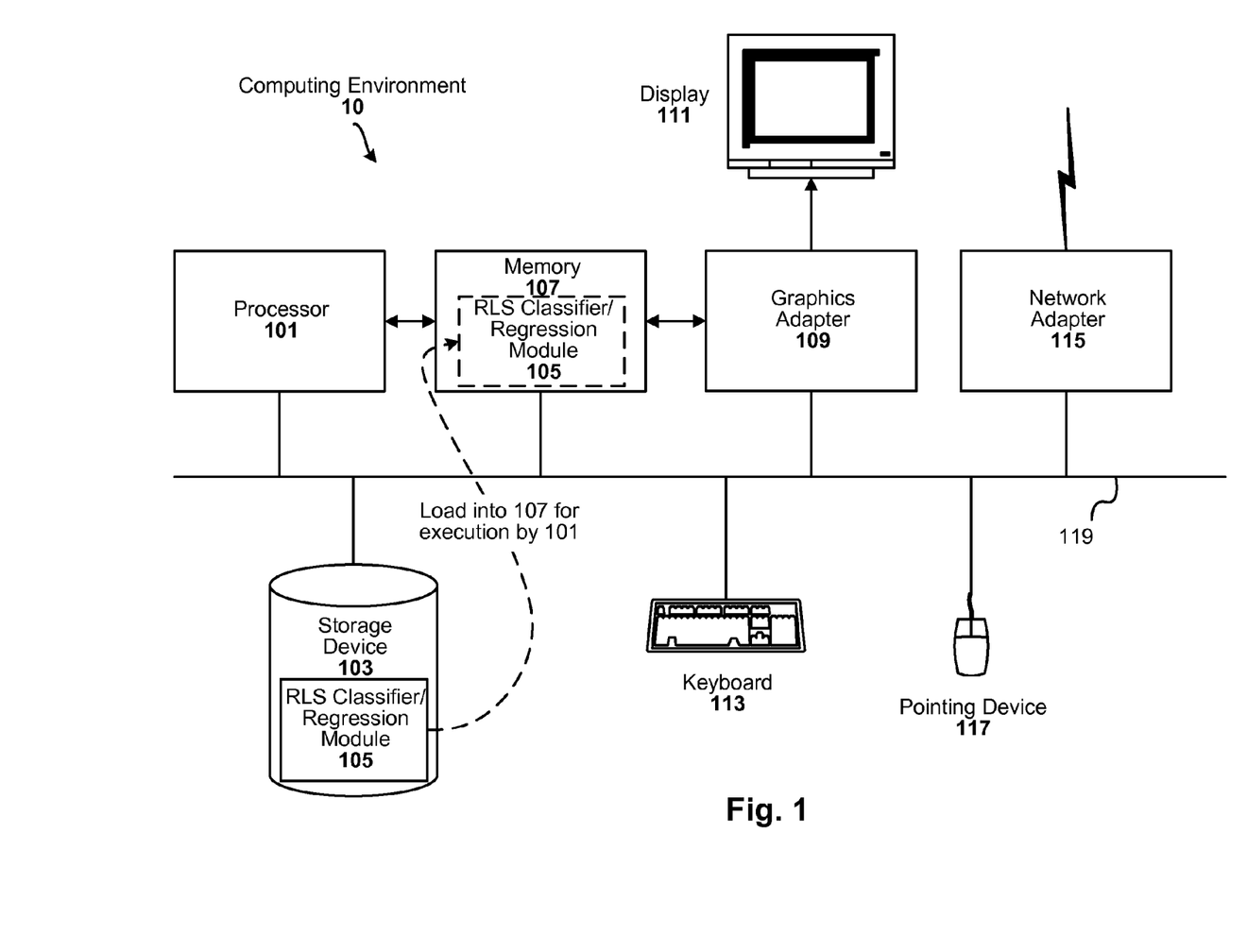
FIG. 1 is a block diagram illustrating a computing environment configured in accordance with an embodiment of the present invention.

FIG. 1 is a block diagram illustrating a computing environment 10 configured in accordance with an embodiment of the present invention.

As can be seen with this example, the computing environment 10 includes a processor 101 operatively coupled via a bus 119 to a memory 107, a storage device 103 for storing an RLS classifier module 105 (and other executable code, such as an operating system and applications), a keyboard 113, a graphics adapter 109, a pointing device 117, and a network adapter 115. A display 111 is operatively coupled to the graphics adapter 109.

The processor 101 may be any processor or set of processors capable of executing various operating systems (e.g., UNIX) and applications/drivers (e.g., MATLAB) of the computing environment 10. Numerous suitable processors (e.g., Intel Pentium, MAC G4 or G5 processors, AMD K processors, as well as any co-processors and other typical computing optimizations such as on-board caches) can be used, as will be apparent in light of this disclosure. The memory 107 may be, for example, firmware ROM, RAM, and/or flash memory, and holds instructions and data used by the processor 101 (e.g., 512 MByte or higher). The storage device 103 is a hard disk drive in one embodiment (e.g., 10 GByte or higher), but can also be any other device capable of persistently storing data, such as a memory stick and/or a solid-state memory device. The storage device 103 can hold multiple files containing executable code and/or data, as is typically done. The computing environment 10 operates to load an executable file into memory 107 and execute it using the processor 101. In the embodiment shown, the RLS classifier module 105 is stored in storage device 103 as executable code, and is loaded into memory 107 for execution by the processor 101 as one or more processes.

The files stored on the storage device 103 can be, for example, in the MATLAB format (sometimes referred to as M-files). Other file formats may also be stored on storage device 103, such as .EXE files, .DLL files, .INI files and any other file types necessary for the computing environment to properly operate. Such files are typical of computing environments that employ Microsoft operating systems. Other file formats, such as those utilized by Apple Macintosh and UNIX based computers will be apparent in light of this disclosure.

The pointing device 117 may be a mouse, track ball, or other such user input device, and is used in combination with the keyboard 113 to allow the user to interact with the computing environment 10 (e.g. input data and respond to prompts), as is typically done. The graphics adapter 109 displays images and other information on the display 111. The network adapter 115 communicatively couples the computing environment 10 with an external network such as the Internet or LAN, or combination thereof (e.g., via conventional wired or wireless technology), if so desired and as is typically done.

The computing environment 10 is adapted to execute computer program modules for providing RLS functionality described herein, including those of RLS classifier module 105. Structure and functionality of the RLS classifier module 105 will be discussed in further detail with reference to FIGS. 2 through 5. As will be apparent in light of this disclosure, the computing environment 10 can be implemented via processing systems such as a general purpose desktop or laptop computer, or a special-purpose processing system configured to carryout the RLS classification (or RLS regression) as described herein. In one particular case, the computing environment 10 is implemented with an IBM T42 laptop with a 1.7 GHz Pentium-M processor and 2 GBytes of RAM. Other computationally intensive processes can be limited as needed to reserve processing power for RLS processing as discussed herein, although a standard user desktop environment can also be running.

RLS Classifier/Regression Module

Figure 2:
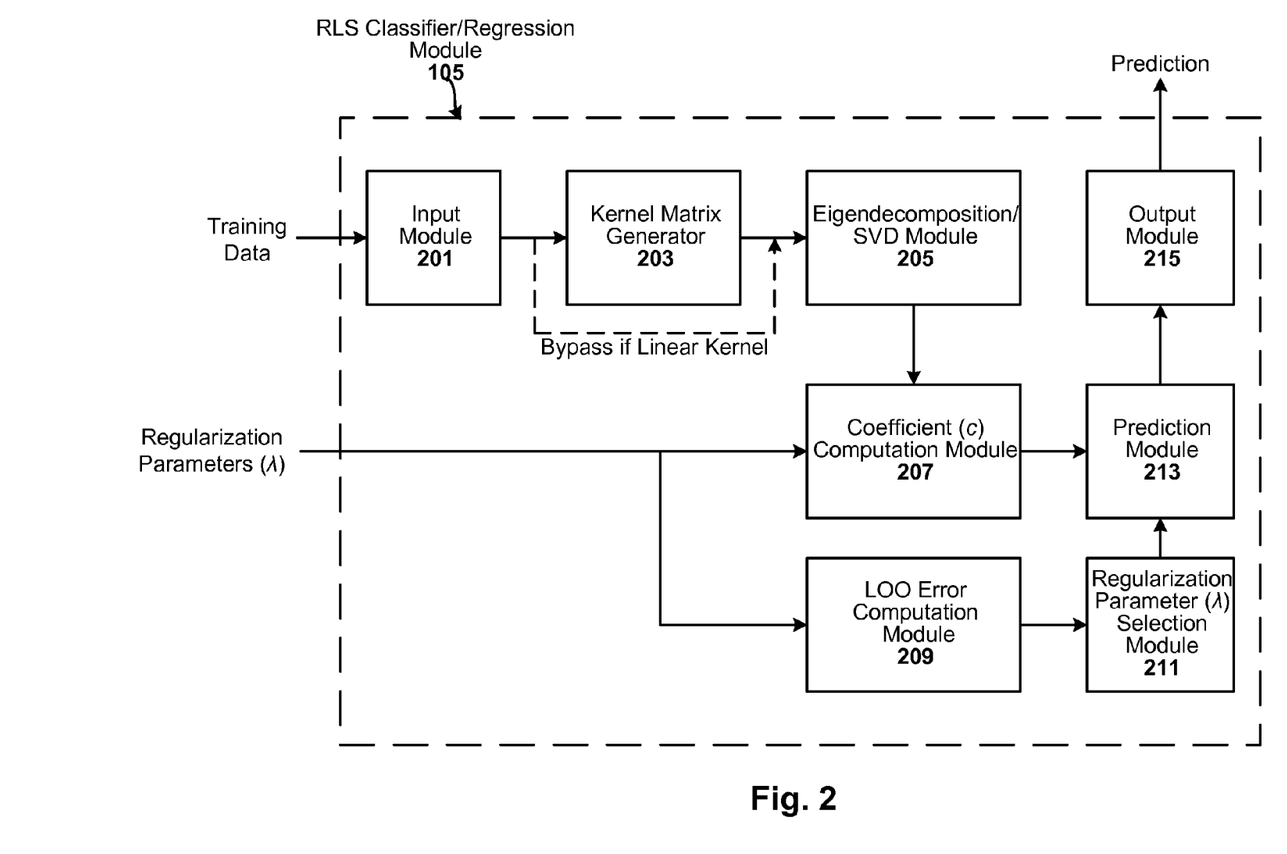
FIG. 2 is a block diagram illustrating a regularized least squares (RLS) classifier/regression module configured accordance with an embodiment of the present invention.
Figure 3A:
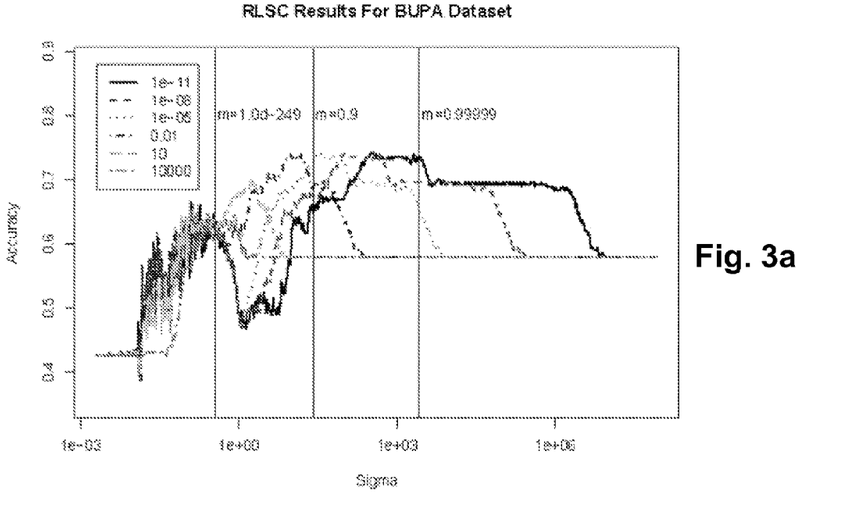
FIGS. 3a-d each illustrates accuracy of an RLS classifier/regression over a range of σ and λ, in accordance with an embodiment of the present invention.
Figure 3B:
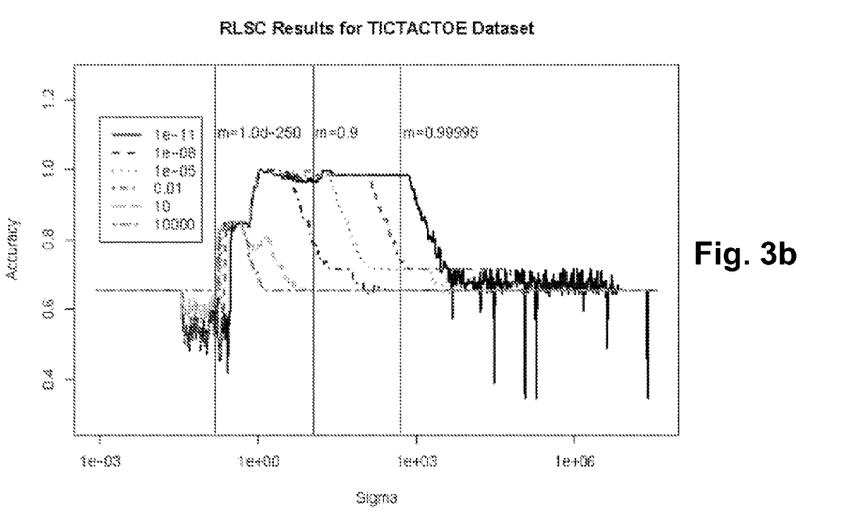
Figure 3C:
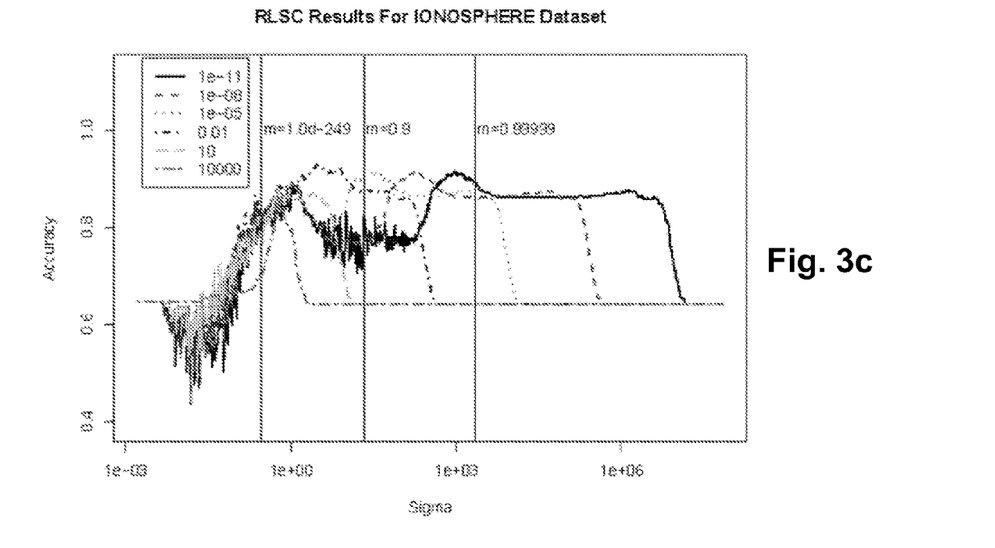
Figure 3D:
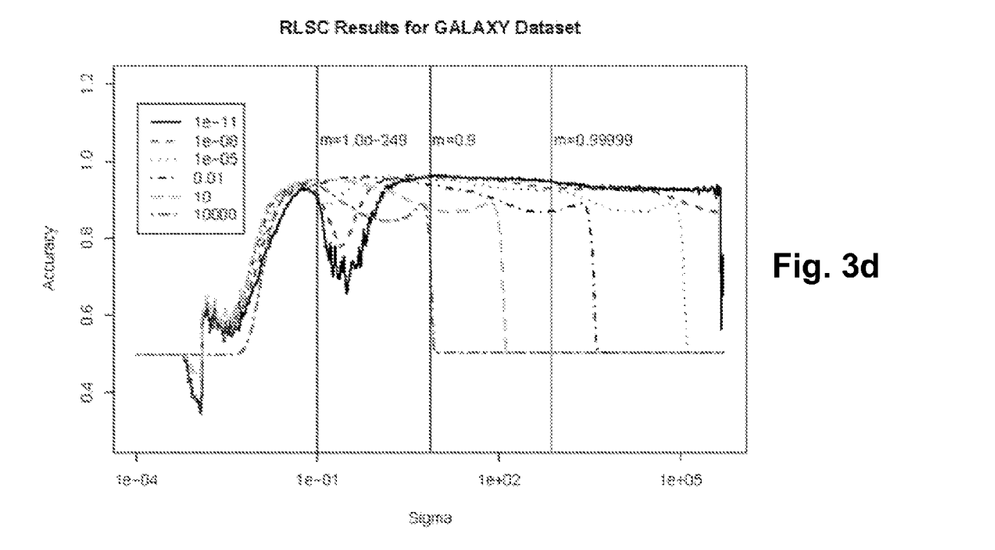

FIG. 2 is a block diagram illustrating modules within the RLS classifier/regression module 105 configured in accordance with an embodiment of the present invention.

As can be seen, module 105 includes an input module 201, a kernel matrix generator 203, an eigendecomposition/SVD module 205, a coefficient (c) computation module 207, a leave-one-out (LOO) error computation module 209, a regularization parameter ($\lambda$) selection module 211, a prediction module 213, and an output module 215. In one particular embodiment, each of these modules is implemented with executable software (e.g., C, C++, or other suitable instruction set) for providing the specified functionality. Note, however, that such modules can also be implemented in hardware (e.g., gate-level logic), firmware (e.g., microcontroller configured with embedded routines for carrying out each module's functionality), or some combination thereof. It will be understood in light of this disclosure that the modules illustrated herein represent one embodiment of the present invention. Other embodiments may include additional and/or different modules and functionality. Likewise, other embodiments may lack modules described herein and/or distribute the described RLS functionality among the modules in a different manner.

The input module 201 is programmed or otherwise configured to receive a training set of data. This data is used to train the RLS classifier/regression module 105 for use in a given application (such as face or voice recognition). This dataset can be represented as $S=(\bar{x}_1, y_1), (\bar{x}_2, y_2), \ldots, (\bar{x}_n, y_n)$ of n points in d dimensions. As previously indicated, the inductive learning task is to build a function $\theta(\bar{x})$ that, given a new point $\bar{x}$, can predict the associated y value. The input module 201 may be further configured to format and structure the input dataset as needed (if at all), in preparation for generating the kernel matrix generation of pairwise distances. The kernel matrix generator 203 is programmed or otherwise configured to form a kernel matrix (K) of the pairwise distances, where the kernel matrix K is size $O(n^2)$. Note that the kernel matrix generator 203 does not apply to the case of a linear kernel, where a singular value decomposition process can be used, in accordance with one embodiment of the present invention, and as will be discussed in turn.

For an RLSC algorithm in accordance with an embodiment of the present invention, the leave-one-out (LOO) error values are given explicitly via the formula:

$$LOOerror = \frac{G^{-1}Y}{diag(G^{-1})}$$
$$= \frac{c}{diag(G^{-1})}$$

As can be seen, the LOO values can be computed given the training weights c (also referred to as coefficients c; in general, c represents training points on the functional expansion) and the diagonal of the inverse of the regularized kernel matrix G. Given the eigendecomposition $K=Q\Lambda Q^t$, $c(\lambda)$ can be computed in $O(n^2)$. LOO error can also be computed in $O(n^2)$ time. A single entry of $G(\lambda)^{-1}$ can be computed in $O(n)$ time, as will be discussed with reference to module 207. Thus, $diag(G^{-1})$ can be computed, and compute LOO error, in $O(n^2)$ time.

The coefficient c computation module 207 is programmed or otherwise configured to receive a collection of regularization parameters ($\lambda$), and to compute coefficients c for each $\lambda$ using the matrix decomposition computed by module 205. In more detail, for a given $\lambda$, module 207 operates to compute the associated c and $diag(G^{-1})$ by exploiting the fact that adding $\lambda I$ to K shifts all the eigenvalues by $\lambda$, but does not change the associated eigenvectors: $(K+\lambda I)=V(\Lambda+\lambda I)V^t$. In one particular embodiment, the coefficient c computation module 207 operates to apply the following formulae to compute c for each $\lambda$:

$$c = V(\Lambda + \lambda I)^{-1} V' y$$
$$G_{ij}^{-1} = (Q(\Lambda + \lambda I)^{-1} Q^t)_{ij}$$
$$= \sum_{k=1}^{n} \frac{Q_{ik} Q_{jk}}{\Lambda_{kk} + \lambda}$$

Thus, it takes $O(n^3)$ to solve a single RLS problem for c. If an eigendecomposition of K is computed, $c(\lambda)$ can be computed and ||LOO error ($\lambda$)|| over a quite fine grid of $\lambda$, at basically no additional cost. Applying these techniques uses $O(n^3)$ time and $O(n^2)$ memory.

The eigendecomposition/SVD module 205 is programmed or otherwise configured to compute the eigendecomposition of the kernel matrix K. Alternatively, or in addition to (and for the case of a linear kernel), the eigendecomposition/SVD module 205 can be configured to compute the singular value decomposition (SVD) of the data matrix (the training set of data).

With respect to the special case of a linear kernel $k(X_i, X_j)=X_i^t \cdot X_j$, assume we are in $R^d$, with d<n. If d>n, then ignore the fact that the kernel is linear, and use the eigendecomposition approach previously discussed. Assuming d<n, then define the matrix X to contain the entire training set, with one data point per row: the $i^{th}$ row of X is $X_i^t$. Note that this is a mathematical notation decision; not a decision about how to represent data on disk or in memory. With this convention, X has n rows and d columns. With a linear kernel, the function being learned is linear as well:

$$f(x) = \sum_{i} c_i k(X_i, x)$$
$$= c^t X x$$
$$= w^t x,$$

where the hyperplane w is defined to be $X^t c$. New points can be classified in O(d) time, using w, rather than having to compute a weighted sum of n kernel products (which will usually cost O(nd) time). Further assume that the n by d data matrix X has full column rank and economy-size singular value decomposition $X=USV^t$, where $U^t U=VV^t=V^t V=I_d$. Note that $UU^t \ne I_n$), and S is a positive semi-definite diagonal matrix of singular values. The kernel matrix K is given by $K=XX^t=(USV^t)(VSU^t)=US^2U^t$. Expressions can be derived for the expansion coefficients c, the hyperplane function w, and the LOO error values. In accordance with one embodiment of the present invention, one set of formulas is obtained by directly using the relevant formulas for nonlinear LOO, but $$c = (K + \lambda I)^{-1} Y$$
$$= (US^2 U^t + \lambda I)^{-1} Y$$
$$= U(S^2 + \lambda I)^{-1} U^t Y + \lambda^{-1} U_{\perp} U_{\perp}^t Y$$

assuming we have the SVD:

$$w = X^t c$$
$$= VSU^t \left( U(S^2 + \lambda I)^{-1} U^t Y + \lambda^{-1} U_{\perp} U_{\perp}^t Y \right)$$
$$= VS(S^2 + \lambda I)^{-1} U^t Y$$

$$diag(G^{-1}) = diag\left(U(S^2 + \lambda I)^{-1} U^t + \lambda^{-1} U_{\perp} U_{\perp}^t\right)$$
$$diag\left(U(S^2 + \lambda I)^{-1} U^t + \lambda^{-1} (I - UU^t)\right).$$

Computing the SVD takes $O(nd^2)$ time and O(nd) memory. Once U is computed, c and $diag(G^{-1})$ can be obtained, for a given value of $\lambda$, in O(nd) time. Note that when n>>d, this represents an enormous savings, in that a good $\lambda$ can be found in time $O(nd^2)$ rather than time $O(n^3)$. For large datasets in high dimensions, there may be difficulty in fitting the dataset in memory. Also, although it is in principle possible to compute SVDs out of core or in parallel on a computing cluster, tools for doing so are not readily at hand. Thus, an alternate linear algebraic view of linear RLS is provided here, in accordance with an embodiment of the present invention. In particular, with a linear kernel, a hyperplane is being found, so the RLS problem can be phrased directly in terms of w, rather than c:

$$\min_{w \in R^d} L(w) = \frac{1}{2} \|Y - Xw\|_2^2 + \frac{\lambda}{2} \|w\|_2^2.$$

Taking the derivative with respect to w, $$\frac{\partial L}{\partial w} = X^t X w - X^t Y + \lambda w,$$

and setting to zero implies $$w = (X^t X + \lambda I)^{-1} X^t Y$$
$$= V(S^2 + \lambda I)^{-1} V^t X^t Y$$
$$\left(= V(S^2 + \lambda I)^{-1} V^t (VSU^t) Y\right)$$
$$\left(= VS(S^2 + \lambda I)^{-1} V^t U^t Y\right).$$

V and $S^2$ can be obtained from an eigendecomposition of the d by d $X^tX$. Additionally, $U=XVS^{-1}$, so any expression involving U can be written as $XVS^{-1}$. One advantage of this formulation is that it is not too difficult to write parallel or out-of-core programs for forming $X^tX$ or $X^ty$. In this approach, the most time consuming step is the formation of the covariance matrix $X^tX$, which takes $O(nd^2)$ time, after which its eigendecomposition can be taken in $O(d^3)$ time. This approach is computationally feasible given the ability to work with d by d matrices, although it does involve some infrastructure effort to form $X^tX$ and $X^ty$. In practice, when dealing with linear functions where n>>d and using the covariance method described herein, it may be preferable just to find w($\lambda$), and validate via a holdout set, rather than computing $U=XVS^{-1}$ as required to compute c and $diag(G^{-1})$. The SVD and covariance based approaches have the same (asymptotic) computational complexity. However, note that the SVD approach may be more numerically stable.

Once the eigendecomposition of the kernel matrix K (or the SVD of the data matrix) is computed by module 205, for a particular choice of $\lambda$, module 207 operates to form c and $diag(G^{-1})$ as previously discussed. The leave-one-out (LOO) error computation module 209 is programmed or otherwise configured to receive the collection of regularization parameters ($\lambda$), and to compute the LOO error for each $\lambda$ $$\left(\text{e.g., LOO error} = \frac{c}{diag(G^{-1})}\right).$$

The regularization parameter ($\lambda$) selection module 211 is programmed or otherwise configured to then select the $\lambda$ with the lowest LOO error (e.g., based on comparison of values).

The prediction module 213 is programmed or otherwise configured to predict future data points based on the RLS function associated (e.g., based on expansion coefficients c or hyperplane function w) associated with the best $\lambda$. The output module 215 is programmed or otherwise configured to output an RLS prediction based on an input data set. The output module 215 may be further configured to format and structure the output prediction data as needed (if at all), in preparation for displaying or otherwise reporting that data.

The time savings provided by this embodiment (relative to direct approaches) is best illustrated with an example. In more detail, and with reference to Table 1, consider the 4192 point, 14 dimension Galaxy Dim dataset. For both the full dataset and a random subset of half the dataset, the LOO error values were computed using both the conventional direct method and an eigenvalue decomposition in accordance with an embodiment of the present invention, and compare the timings. The timing results reported in Table 1 are approximate (e.g., +/−5%), and the order of timings that are close may vary accordingly. All times reported are the average of at least 5 runs; the variance was never large compared to the mean. All times reported are elapsed wall-clock times; there was no swapping to disk, and system time was never more than a small fraction of total time.

TABLE 1

Timings (in seconds) for computing LOO values using direct linear algebra on the Galaxy Dim dataset.

|  | Number of points | |
| --- | --- | --- |
|  | 2048 | 4092 |
| Direct Solve | 12.4 | 106.0 |
| Eigenvalue Decomposition | 28.1 | 268.6 |
| Time per $\lambda$ | 0.4 | 1.7 |
| Total Time, 25 $\lambda$s, Direct | 310.0 | 2650.0 |
| Total Time, 25 $\lambda$s, Eigenvalue Decomposition | 38.1 | 311.1 |
| Ratio, 25 $\lambda$s | 8.1 | 8.5 |
| Ratio, $\infty$ $\lambda$s | 31.0 | 62.5 |

As can be seen, for problems of this size (e.g., 2048 to 4092 points), when three or more $\lambda$s are considered, the eigenvalue approach to LOO error computation in accordance with an embodiment of the present invention has an advantage, and this advantage grows as the number of $\lambda$s increases. As the problem size grows, the relative advantage of the eigenvalue decomposition grows (for sufficiently many $\lambda$s), because the per $\lambda$ cost is $O(n^2)$ rather than $O(n^3)$. Note that although both the direct approach and the full eigendecomposition are $O(n^3)$, for this range of n, a factor of about 8 (slightly more at 8.1 for 2048 points and 8.5 for 4092 points) is paid in time to double the problem size, likely due to memory hierarchy issues. The total time used to compute the LOO values for 25 different $\lambda$s was 38.1 seconds for a 2048 point subset of the data, and 311.1 seconds for the entire 4192 point dataset. The algorithms discussed here use $O(n^2)$ space, so are suitable for moderate-sized datasets. Techniques suitable for large datasets will be discussed in turn.

Varying $\sigma$ and $\lambda$

For purposes of demonstrating its effectiveness, an embodiment of the RLS classifier/regression module 105 was implemented as discussed herein and used to perform large-scale experiments in which, for a given dataset, the bandwidth parameter $\sigma$ is varied through a range of values, and the LOO values are computed for each $\sigma$ value for a large number of regularization parameters $\lambda$. The experiment results are shown for four datasets in FIGS. 3a, 3b, 3c, and 3d, respectively. Other datasets can be used as well, such as those from the UCI machine learning repository (UCI=University of California at Irvine; see, for example, http://www.ics.uci.edu/~mlearn/MLRepository.html), with similar results. In the labeled vertical lines in FIG. 3a-d, note that m represents the smallest entry in the kernel matrices.

A number of interesting observations can be drawn from these FIGS. 3a, 3b, 3c, and 3d. For instance, there is a wide range of values of $\sigma$ for which an accuracy equivalent or very close to the best accuracy can be obtained, with a proper choice of $\lambda$. In addition, an accurate classification/regression can often be obtained with a very large $\sigma$. In particular, $\sigma$ can be chosen so that all entries of the kernel matrix are quite close to 1 (e.g., 0.9999 or greater). Also, in order to successfully classify with large σ, λ must be quite small. It is important to know the limits of numerical formulas.

An empirical approach can be used to performance test the RLS classifier/regression module 105, where two different tests are performed to check the accuracy of the LOO computation. The first test is a spot check, where for some small subset of the data, each point x is explicitly removed from the training set, a classifier is built on the rest of the data, and the classifier is tested on x. The other check is to perturb the data slightly, where all values (the training data, the y values, λ and σ) are perturbed by multiplying each number by an independent random variate of the form (1+ε), where ε is a Gaussian random variable with mean 0 and variance $10^{-13}$. Using both of these approaches, the accuracy reflected in FIGS. 3a, 3b, 3c, and 3d is acceptable. However, the accuracy decreases as λ gets smaller. In general, LOO values at λ<1e-11 may provide an unacceptable accuracy level, depending on the given application.

This ability to classify successfully with such large σ is unexpected, as intuition that RLSC (and SVM) work primarily as a weighted local scheme, in which classification of a test point is determined primarily by a moderate number of close points. In a large σ scheme, the farthest point has nearly as much impact as the closest. The following section discusses how to exploit the large σ to solve large-scale regularized least squares classifier (and regression) problems rapidly and accurately, in accordance with various embodiments of the present invention.

Large Problems, Large σ

For large problems, representing the kernel matrix K explicitly may not be practical due to memory constraints. One approach is to use conjugate gradient (CG), which requires only the ability to multiply a vector by the kernel matrix K. The CG algorithm cannot be used directly to solve for multiple λs in the equation (K+λnI)c=y. Rather, the vector x by which matrix K is multiplied by depends on λ. However, in accordance with one particular embodiment of the present invention, the CG can be multiplexed. In more detail, consider a factorization K=QTQ', where Q is orthonormal and T is symmetric tridiagonal (this factorization is the first step in modern eigenvalue decompositions). The Lanczos process constructs Q and T iteratively. Specifically, if $Q \equiv (q_1 \ldots q_r)$ and $$T \equiv \begin{pmatrix} \alpha_1 & \beta_1 & 0 & \ldots & 0 & 0 \\ \beta_1 & \alpha_2 & \beta_2 & \ldots & 0 & 0 \\ 0 & \beta_2 & \alpha_3 & \ldots & 0 & 0 \\ \ldots & \ldots & \ldots & \ldots & \ldots & \ldots \\ 0 & 0 & 0 & \ldots & \alpha_{r-1} & \beta_{r-1} \\ 0 & 0 & 0 & \ldots & \beta_{r-1} & \alpha_r \end{pmatrix}$$

then Q and T are computed (in exact arithmetic) by the recurrence $$q_k = \frac{x_{k-1}}{\beta_{k-1}} \quad (1)$$

$$\alpha_k = q'_k K q_k \quad (2)$$

$$x_k = K q_k - \alpha_k q_k - \beta_{k-1} q_{k-1} \quad (3)$$

$$\beta_k = \|x_k\|_2 \quad (4)$$

where $\beta_0 = \|x_0\|_2$, $q_0 = 0$ and $x_0$ is an arbitrary non-zero vector. When the process is carried out for r steps, the resulting Q is the orthogonal basis that would be given by Gram-Schmidt orthonormalization of the sequence of vectors $x_0$, $Kx_0$, $K^2x_0$, ... $K^{r-1}x_0$, a Kyrlov subspace.

If $x_0=y$, then $x=QT^{-1}Q'y$ is the $r^{th}$ iterative solution to Kx=y by the conjugate gradient method. Additionally, under a diagonal shift K→K+λI, the quantities computed by equations 1, 2, 3, 4 become Q, T→Q,T+λI, and thus $x=Q(T+\lambda I)^{-1}Q'y$ is the $r^{th}$ iterative solution to (K+λI)x=y. Therefore, only one accurate Lanczos tridiagonalization is needed to obtain solutions to many λs. These solutions can be obtained rapidly, because multiplying by or solving a linear system with a tridiagonal matrix requires only linear time.

A similar approach can be used to compute LOO values. In more detail, $\text{diag}(K(K+\lambda I)^{-1})$ can be approximated, based on the partial tridiagonalization of K, as $\text{diag}(QTQ'(QTQ'+\lambda I)^{-1})$:

$$(QTQ' + \lambda I)^{-1} = Q(T + \lambda I)^{-1}Q' + \frac{1}{\lambda}(I - QQ')$$

$$QTQ'(QTQ' + \lambda I)^{-1} = QT(T + \lambda I)^{-1}Q'$$

Thus, to compute a single element of $\text{diag}(QTQ'(QTQ'+\lambda I)^{-1})$, a row of Q can be multiplied by $T(T+\lambda I)^{-1}$ and then dot the result by the same row of Q, in O(r) time per element. The total time to find the approximate $\text{diag}(K(K+\lambda I)^{-1})$ at the $r^{th}$ iteration given Q and T is O(nr). In practice, a slightly slower but simpler approach can be used where a full eigendecomposition of T is formed. The cost is $O(nr+r^3)$, and the difference is not noticeable because r is much smaller than $\sqrt{n}$.

Rounding errors tend to cause a loss of orthogonality among the $q_i$. Thus, a straightforward implementation of equations 1, 2, 3, 4 suffers from instabilities. However, the ARPACK (Lehoucq & Sorensen, 1996; Lehoucq et al., 1997) library provides a numerically stable version of the Lanczos process (it is a stable implementation of the Arnoldi process, of which the Lanczos process is a special case); this library is used in the experiments discussed herein.

The math described here applies regardless of σ. However, there are at least two reasons that it is useful to use as large a σ as possible, both relating to the structure of K. With a Gaussian kernel and points in general position, K is full rank for any σ, in exact arithmetic. However, the larger σ is, the faster K's spectrum decays, the easier it is to approximate K with a matrix of low rank, and the easier it is to form an accurate matrix-vector product Kx in less than $O(n^2)$ time. Much of the previous work on making nonlinear RLS classification fast (Smola & Scholkopf, 2000; Willams & Seeger, 2000) has focused on such approximations, but have not made the connection that a large σ regime makes these approximations much more tractable. For large σ, there are a number of simultaneous advantages. For instance, fewer matrix-vector products are needed to perform regularized least squares classification, due to the rapidly decaying eigenstructure of K, and approximating the matrix-vector product Kx is much easier.

Improved Fast Gauss Transform (IFGT)

The Improved Fast Gauss Transform (IFGT) can be used to form (approximate) matrix-vector products Kx, in accordance with one embodiment of the present invention. Other approaches, such as the Nystrom method, can also be used. The IFGT picks a set of centers and computes the matrix-vector product Kx using a sum of truncated Hermite expansions around the centers. For purposes herein, the IFGT is treated mostly as a black box—it is given a matrix A, a vector x, and a parameter p, and the IFGT returns a "$p^{th}$ order" approximation to Ax. Performing a single $p^{th}$ order IFGT takes $O(nd^P)$ time and $O(nd^P)$ space; under the assumption that only a constant number of iterations of CG is required, the resulting algorithm will be $O(nd^P)$ in both time and space. When $d^P \ll n$, this can be a very effective scheme.

Figure 4:
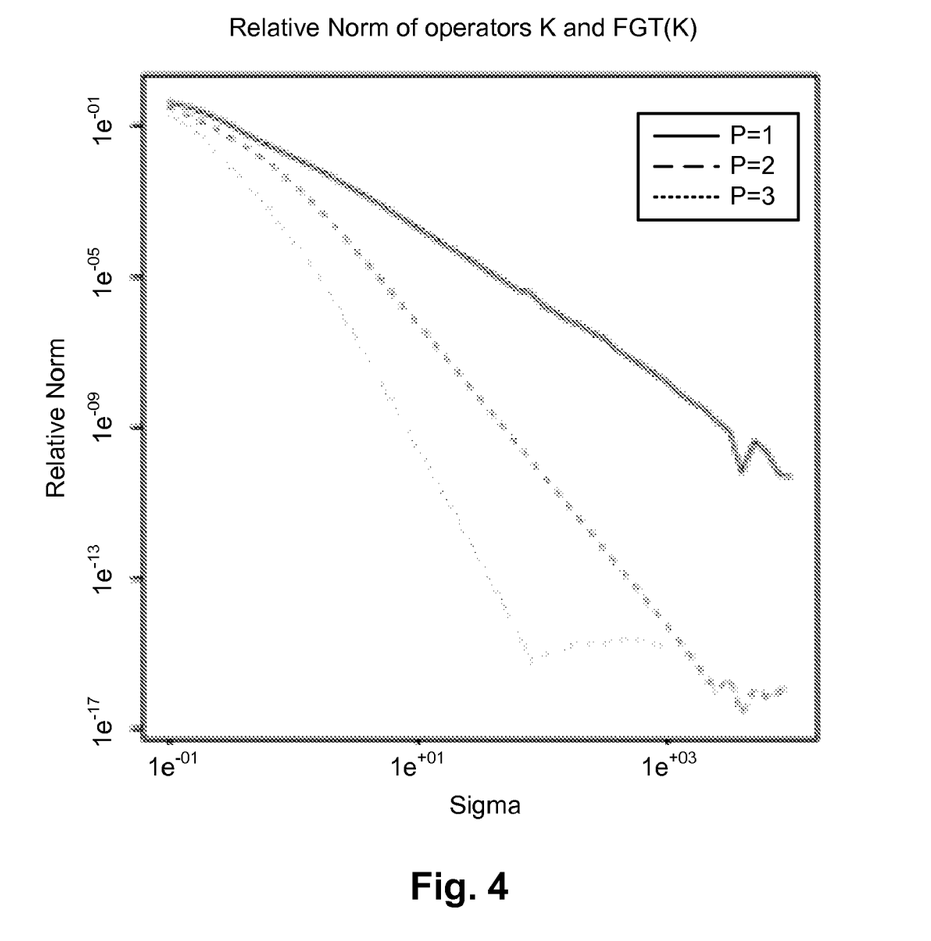
FIG. 4 illustrates $\|K-FGT(K)\|/\|K\|$ for an example dataset, where p is the order of the polynomial expansion, in accordance with an embodiment of the present invention.

Yang et al. perform experiments showing that, for a fixed, small σ, the IFGT converges slowly but eventually in the polynomial order p. Yang also shows that the running time of the IFGT for small p(p=1, 2) is quite attractive. However, Yang does not consider varying σ or λ. Rather, Yang uses a single value of σ for each dataset (0.5d), and does not specify λ. The same datasets in Yang are considered herein, but performance is achieved that is uniformly better (and often substantially so) because a good σ is found and the appropriate λ is chosen. Recalling that the norm of an operator A is defined as $\max_{\|v\|=1} \|Av\|$, consider the relative norms of the operator (K−IFGT(K)) and K; operator norms are computed, for example, by performing 20 iterations of an Arnoldi process to find to high accuracy the largest eigenvalue of the operator. The Arnoldi is used rather than the Lanczos process because the IFGT is asymmetric: in general, y'·IFGT(x)≠IFGT(y)'·x. In FIG. 4, this relative norm is plotted over a wide range of sigmas and p=1, 2, 3 for the Galaxy Dim dataset. Note that the performance of the RLS classifier with IFGT (in accordance with one embodiment of the present invention) gets better with increasing order and increasing σ, with the curve eventually flattening as floating-point accuracy limits are reached (e.g., $10^{16}$).

Experiments

Once again, consider the Galaxy Dim dataset. Galaxy Dim is especially suited to this example because of its size (4192 points); it is large enough to allow one to reasonably see the asymptotics by playing with a subset of it, but small enough to allow one to compare methods that do and do not need the entire kernel matrix K. Recall from Table 1 that the total time used to compute the LOO values for 25 different λs was 38.1 seconds for a 2048 point subset of the data, and 311.1 seconds for the entire 4192 point dataset. Using the methods described herein, with the matrix vector multiply implemented using a $3^{rd}$ order IFGT and σ=100, the same computation uses only 19.3 seconds for the 2048 point subset, and 38.3 seconds for the entire 4192 point dataset. The results were essentially identical—for all λ>=1e-11, no more than 2 points were classified differently by the full eigenvalue decomposition and the IFGT-based method, in accordance with one embodiment of the present invention. The timing is essentially linear: the IFGT is linear in the dataset size, but slightly more iterations were required for convergence for the larger dataset. Lower order IFGTs use substantially less time per IFGT iteration, but may provide insufficient accuracy.

Now, consider the 8124 point, 22 dimensional dataset Mushroom, for which it is typically not practical to work directly with the entire kernel matrix. Using the RLS with IFGT approach described herein, the LOO values are computed for this dataset over a range of λ (e.g., $10^{-16}$ to $10^{+16}$), for σ=100, in 260 seconds. The best λ was computed to be 1e-11, leading to a LOO accuracy of 88.8%. For a 4062 point subset of the data, only 137 seconds of work were needed; again, note that the RLS with IFGT algorithm is essentially linear time.

Methodology

Figure 5:
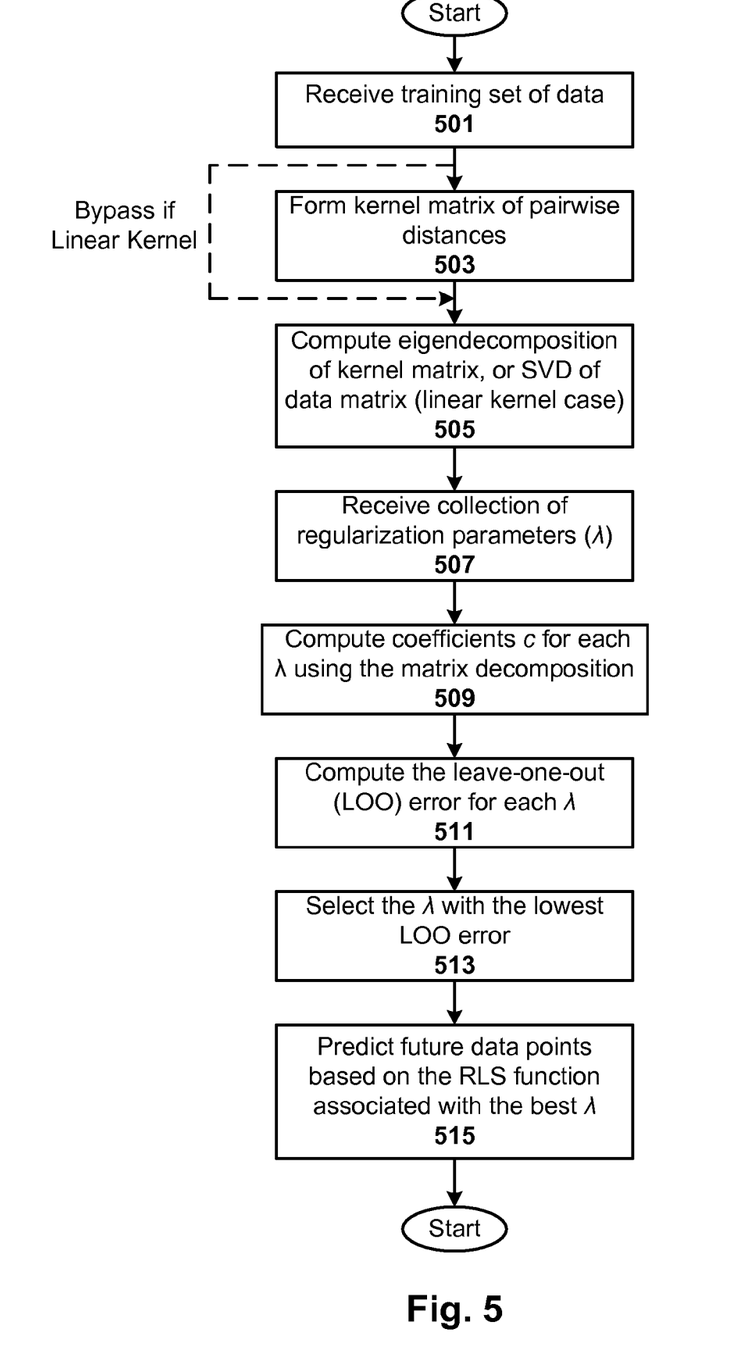
FIG. 5 illustrates an RLS classification/regression methodology configured in accordance with an embodiment of the present invention.

FIG. 5 illustrates an RLS classification/regression methodology configured in accordance with an embodiment of the present invention. The method can be carried out, for example, by the RLS classification/regression module 105 previously discussed with reference to FIGS. 1 and 2.

The method includes receiving 501 a training set of data. It the case of a linear kernel, step 503 is skipped and the method continues to step 505. Otherwise, the method continues with forming 503 a kernel matrix of pairwise distances using the input training set. Note that the method may further include receiving an actual dataset to be processed, once the RLS classifier/regression module is trained as described herein.

The method continues with computing 505 the eigendecomposition of the kernel matrix, or computing 505 the SVD of the data matrix (in the case of a linear kernel), as previously explained. One particular embodiment of the present invention is adapted to carry out both eigendecomposition and SVD (e.g., user-configurable). The method further includes receiving 507 a collection of regularization parameters (λ). The range and resolution of the λ collection, which can be provided manually (e.g., input by user) or automatically (e.g., read from a previously stored filed or hard coded or computed dynamically based on user input specifying a target range and resolution) will depend on factors such as the desired accuracy and robustness of the classifier. In one particular embodiment, the collection of λs ranges from $10^{-16}$ to $10^{+16}$ and includes a resolution of 200 to 400 intermediate λ values evenly spaced therebetween. Such a broad range allows for convergence (e.g., ranges from too small to too big) and provides sufficient resolution without requiring excessive computation to achieve that convergence.

The method continues with computing 509 coefficients (c) for each λ using the matrix decomposition computed in step 505 (whether using eigendecomposition or SVD). In one particular embodiment, and as previously explained, the coefficients c can be computed using: $c = V(\Lambda + \lambda I)^{-1} V'y$, as previously explained. Alternatively, can be computed using: $c = U(S^2 + \lambda I)^{-1} U'Y + \lambda^{-1} U_\perp U_\perp' Y$ (for the linear kernel case). Note that $\text{diag}(G^{-1})$ can also be computed here, as previously discussed. Once the coefficients c are computed, the method continues with computing 511 the LOO error for each of the λs in the collection.

The method continues with selecting 513 the λ with the lowest LOO error. As previously explained, this selection of the appropriate λ is not trivial and enables an accurate classifier. The method may then proceed with predicting 515 future data points based on the RLS function associated with the best λ (e.g., based on coefficients c or hyperplane function w associated with the best λ). The actual classification application (i.e., what is being predicted, such as face, objects, sounds, etc) or regression application (i.e., size of number being predicted, such as lifespan, salary, etc) can vary, as will be apparent in light of this disclosure.

Further recall that two approaches for rapid LOO RLS processing over a range of λ can be used, in accordance with two embodiments of the present invention: an $O(n^3 + n^2 d)$ time, $O(n^2)$ memory approach for small to moderately sized datasets, and an $O(nd^P)$ time, $O(nd^P)$ memory (where p is the order of the IFGT used) approach for large datasets that employs large σ.

The foregoing description of the embodiments of the invention has been presented for the purposes of illustration and description. It is not intended to be exhaustive or to limit the invention to the precise form disclosed. Many modifications and variations are possible in light of this disclosure. For instance, if only finding accurate c is desired and $\text{diag}(G^{-1})$ not needed, then a larger tolerance can be used on the Lanczos process described herein, or a smaller σ. However, a large σ is desirable so that the spectrum of K decays rapidly and the IFGT is accurate; but large σ implies small λ, which implies a low tolerance on our Lanczos process. Thus, appropriate trades must be considered. In addition, the view of an RLS classifier with a Gaussian kernel (as discussed herein) as a largely local learning scheme is dependent on small or moderate $\sigma$; for large $\sigma$, the farthest point has nearly the same impact as the closest. Furthermore, and in considering the asymptotics of an RLS classifier, note that as $\sigma \to \infty$ and $\lambda \to 0$, the RLS classifier converges into a certain polynomial classification scheme, whose order depends on the rate at which $$\frac{\lambda}{\sigma} \to 0.$$

Likewise, note that the techniques described herein can be equally applied to both RLS classification and RLS regression problems. It is intended that the scope of the invention be limited not by this detailed description, but rather by the claims appended hereto.

What is claimed is:

1. A computer-implemented methodology for regularized least squares (RLS) classification or regression, the method executed by one or more computer systems comprising a processor and a memory, the method comprising:
   receiving, by a processor, a training set of data;
   generating a kernel matrix K based on the training set, wherein the kernel matrix is represented explicitly in an n by n matrix satisfying $K_{ij}=K(\bar{x}_i, \bar{x}_j)$ and having a form $$K(\bar{x}_i, \bar{x}_j) = \exp\left(\frac{\|\bar{x}_i - \bar{x}_j\|^2}{2\sigma^2}\right),$$

where x is a vector of data points included in the training set and $\sigma$ is a user-selected bandwidth parameter;
   computing, by the processor, an eigendecomposition of the kernel matrix K;
   receiving a plurality of regularization parameters $\lambda$;
   computing, by the processor, coefficients c for each regularization parameter $\lambda$ based on the eigendecomposition of the kernel matrix K;
   computing, by the processor, a leave-one-out (LOO) error for each of the regularization parameters $\lambda$, wherein the LOO error for all the regularization parameters $\lambda$ are computed in $O(n^3+n^2 d)$ time and $O(n^2)$ space, where n is the number of points in d dimensions of the training set;
   selecting the regularization parameter $\lambda$ with the lowest LOO error;
   identifying a hyperplane function w based on the selected regularization parameter $\lambda$ and the training set of data; and
   storing the hyperplane function w in the memory.

2. The method of claim 1, wherein the hyperplane function w is used in regularized least squares (RLS) classification, the regularized least squares (RLS) classification comprising:
   predicting a class y associated with a set of input data points based on at least one of coefficients c and the hyperplane function w.

3. The method of claim 2, wherein the input data points and the training set of data represent one selected from a group consisting of face recognition data, object tracking data, room navigation data, medical image analysis data, and voice recognition data.

4. The method of claim 1 further comprising:
   storing the kernel matrix K in the memory.

5. The method of claim 1, wherein the hyperplane function w is used in regularized least squares (RLS) regression and further comprising:
   predicting a set of values associated with a set of input data points based on at least one of coefficients c and the hyperplane function w.

6. A machine-readable medium encoded with instructions, that when executed by one or more processors, cause the processor to carry out a process for regularized least squares (RLS) classification or regression, the process comprising:
   receiving, by a processor, a training set of data;
   generating a kernel matrix K based on the training set, wherein the kernel matrix is represented explicitly in an n by n matrix satisfying $K_{ij}=K(\bar{x}_i, \bar{x}_j)$ and having a form $$K(\bar{x}_i, \bar{x}_j) = \exp\left(\frac{\|\bar{x}_i - \bar{x}_j\|^2}{2\sigma^2}\right),$$

where x is a vector of data points included in the training set and $\sigma$ is a user-selected bandwidth parameter;
   computing, by the processor, an eigendecomposition of the kernel matrix K;
   receiving a plurality of regularization parameters $\lambda$;
   computing, by the processor, coefficients c for each regularization parameter $\lambda$ based on the eigendecomposition of the kernel matrix K;
   computing, by the processor, a leave-one-out (LOO) error for each of the regularization parameters $\lambda$, wherein the LOO error for all the regularization parameters $\lambda$ are computed in $O(n^3+n^2 d)$ time and $O(n^2)$ space, where n is the number of points in d dimensions of the training set;
   selecting the regularization parameter with the lowest LOO error;
   identifying a hyperplane function w based on the selected regularization parameter $\lambda$ and the training set of data; and
   storing the hyperplane function w in a memory associated with the processor.

7. The machine-readable medium of claim 6, wherein the hyperplane function w is used in regularized least squares (RLS) classification, the regularized least squares (RLS) classification comprising:
   predicting a class y associated with a set of input data points based on at least one of coefficients c and the hyperplane function w.

8. The medium of claim 7, wherein the input data points and the training set of data represent one selected from a group consisting of face recognition data, object tracking data, room navigation data, medical image analysis data, and voice recognition data.

9. The machine-readable medium of claim 6, the process further comprising:
   storing the kernel matrix K in the memory associated with the processor.

10. The medium of claim 6, wherein the hyperplane function w is used in regularized least squares (RLS) regression and further comprising:
    predicting a set of values associated with a set of input data points based on at least one of coefficients c and the hyperplane function w.

11. A regularized least squares (RLS) classification or regression system, comprising:
    a processor;
    an input module to receive a training set of data at the processor;

a kernel matrix generator to generate a kernel matrix K based on the training set, wherein the kernel matrix is represented explicitly in an n by n matrix satisfying $K_{ij}=K(\bar{x}_i, \bar{x}_j)$ and having a form $$K(\bar{x}, \bar{x}_j) = \exp\left(\frac{\|\bar{x}_i - \bar{x}_j\|^2}{2\sigma^2}\right),$$

where x is a vector of data points included in the training set and σ is a user-selected bandwidth parameter;

a matrix decomposition module to compute an eigendecomposition of the kernel matrix K at the processor;

a coefficient computation module to receive a plurality of regularization parameters λ and computing, at the processor, coefficients c for each regularization parameter λ using the eigendecomposition of the kernel matrix K;

a LOO error computation module to receive the plurality of regularization parameters λ and computing, at the processor, a leave-one-out (LOO) error for each of the regularization parameters λ, wherein the LOO error for all the regularization parameters λ are computed in $O(n^3 + n^2d)$ time and $O(n^2)$ space, where n is the number of points in d dimensions of the training set;

a regularization parameter selection module to select the regularization parameter λ with the lowest LOO error; and an RLS classification or regression module to identify a hyperplane function w based on the selected regularization parameter λ and the training set of data and storing the hyperplane function w in a memory associated with the processor.

12. The system of claim 11 wherein the hyperplane function w is used in regularized least squares (RLS) classification and the system further comprises:

a prediction module to predict a class y associated with a set of input data points based on at least one of coefficients c and the hyperplane function w.

13. The system of claim 12, wherein the input data points and the training set of data represent one selected from a group consisting of face recognition data, object tracking data, room navigation data, medical image analysis data, and voice recognition data.

14. The system of claim 11 further comprising:

a memory for storing the kernel matrix K.

15. The system of claim 11, wherein the hyperplane function w is used in regularized least squares (RLS) regression and the system further comprises:

a prediction module to predict a set of values associated with a set of input data points based on at least one of the coefficients c and the hyperplane function w.

* * * * *

UNITED STATES PATENT AND TRADEMARK OFFICE
CERTIFICATE OF CORRECTION

PATENT NO. : 7,685,080 B2
APPLICATION NO. : 11/535921
DATED : March 23, 2010
INVENTOR(S) : Ryan Rifkin and Ross Lippert It is certified that error appears in the above-identified patent and that said Letters Patent is hereby corrected as shown below:

Column 17, line 24 after "n $^2$d" insert -- ) --.

Signed and Sealed this

Eighth Day of June, 2010

David J. Kappos
*Director of the United States Patent and Trademark Office*